(12) United States Patent
Nakazato et al.

(10) Patent No.: US 10,929,857 B2
(45) Date of Patent: Feb. 23, 2021

(54) ASSISTANCE METHOD FOR ASSISTING IN PROVISION OF EC ABROAD, AND PROGRAM OR ASSISTANCE SERVER FOR ASSISTANCE METHOD

(71) Applicant: zig-zag, Inc., Shibuya-ku (JP)

(72) Inventors: Kazuyoshi Nakazato, Shibuya-ku (JP); Hisashi Arakaki, Shibuya-ku (JP)

(73) Assignee: ZIG-ZAG, INC., Tokyo (JP)

( * ) Notice: Subject to any disclaimer, the term of this patent is extended or adjusted under 35 U.S.C. 154(b) by 414 days.

(21) Appl. No.: 15/754,940

(22) PCT Filed: Aug. 29, 2016

(86) PCT No.: PCT/JP2016/075140
§ 371 (c)(1),
(2) Date: Feb. 23, 2018

(87) PCT Pub. No.: WO2017/038739
PCT Pub. Date: Mar. 9, 2017

(65) Prior Publication Data
US 2020/0242627 A1     Jul. 30, 2020

(30) Foreign Application Priority Data
Aug. 28, 2015  (JP) .............................. JP2015-168692

(51) Int. Cl.
*G06Q 30/00* (2012.01)
*G06Q 30/02* (2012.01)
(Continued)

(52) U.S. Cl.
CPC ........... *G06Q 30/02* (2013.01); *G06F 16/958* (2019.01); *G06Q 10/08* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 2002/0059098 A1 | 5/2002 | Sazawa et al. | |
| 2003/0041033 A1* | 2/2003 | Kaplan | G06Q 10/0831 705/64 |

(Continued)

FOREIGN PATENT DOCUMENTS

| | | |
|---|---|---|
| JP | 2002-215975 | 8/2002 |
| JP | 2004-295769 | 10/2004 |

(Continued)

OTHER PUBLICATIONS

Luo, Peng, Effect on SME's Foreign Trade through E-Commerce and Countermeasures, Jan. 14, 2010, 2010 International Conference on E-Product E-Service and E-Entertainment, pp. 1-4 (Year: 2010).*

(Continued)

*Primary Examiner* — Jeffrey A. Smith
*Assistant Examiner* — Timothy J Kang
(74) *Attorney, Agent, or Firm* — Cozen O'Connor

(57) ABSTRACT

Provided is a method for assisting provision of EC abroad, and for encouraging cross-border EC by making delivery abroad easier. The method includes the steps of: sending, by the assisting server 100, display information of at least one of articles included in article information for an existing EC site to a user terminal 120 of a foreign user (S201); receiving, by the assisting server 100, a notice that a displayed article was selected from the user terminal 120 (S202); and further includes the steps of: sending, by the assisting server 100, a purchase cost of the selected article to the user terminal 120 (S203); and receiving, by the assisting server 100, a notice to purchase the selected article from the user terminal 120 (S204).

10 Claims, 8 Drawing Sheets

(51) Int. Cl.
*G06F 16/958* (2019.01)
*G06Q 10/08* (2012.01)
*G06Q 30/06* (2012.01)

(56) References Cited

U.S. PATENT DOCUMENTS

| | | | | |
|---|---|---|---|---|
| 2008/0140542 | A1* | 6/2008 | Perron | G06Q 30/0641 |
| | | | | 705/27.1 |
| 2011/0196690 | A1* | 8/2011 | Peles | G06Q 30/02 |
| | | | | 705/1.1 |
| 2013/0117122 | A1* | 5/2013 | Cooper | G06Q 30/0261 |
| | | | | 705/14.58 |
| 2014/0280919 | A1* | 9/2014 | Lakes | H04L 67/2814 |
| | | | | 709/224 |

FOREIGN PATENT DOCUMENTS

| | | |
|---|---|---|
| JP | 2008-269477 | 11/2008 |
| JP | 2013-58131 | 3/2013 |

OTHER PUBLICATIONS

Kotori, "Kaigai kara no Access o Furiwakeru [php]", [online], Jan. 21,2015, https://webarchive.org/web/20150130223543/http://kotori-blog.com/php/globalaccess with English translation.

* cited by examiner

SEND DISPLAY INFORMATION — S201

ARTICLE SELECTION BY USER — S202

SEND PURCHASE COST — S203

NOTICE TO PURCHASE — S204

FIG. 4 ized by a user attribute of the foreign user are displayed on the user terminal.

ASSISTANCE METHOD FOR ASSISTING IN PROVISION OF EC ABROAD, AND PROGRAM OR ASSISTANCE SERVER FOR ASSISTANCE METHOD

RELATED APPLICATIONS

This is a U.S. National Phase Application under 35 USC 371 of International Application PCT/JP2016/075140 filed on Aug. 29, 2016.

This application claims the priority of Japanese application no. 2015-168692 filed Aug. 28, 2015, the entire content of which is hereby incorporated by reference.

FIELD OF THE INVENTION

The present invention relates to a method for assisting provision of electronic commerce (EC) abroad, a program therefor, or an assisting server.

BACKGROUND OF THE INVENTION

In recent years, the spread of the Internet, and further the spread of smartphones have progressed rapidly, so that various information can be obtained borderless across national borders. There are various websites from which information can be obtained and access from abroad to a website that provides EC (EC site) is also on the rise. Depending on an EC site, even if the EC site does not support foreign languages, there are examples where a certain percentage of access is flowing from abroad.

However, even if accessed from abroad, in the case of EC sites, unlike websites aiming to transmit information, it is impossible to achieve its purpose unless settlement and delivery are completed, which is an obstacle to globalization. Delivery abroad, in particular, has various problems.

SUMMARY OF THE INVENTION

The present invention has been made in view of such a problem, and one object is to provide a method for assisting provision of EC abroad, and for encouraging cross-border EC by making delivery abroad easier.

Also, an object of the present invention is to provide a program for causing a computer to execute the assisting method, and to provide an assisting server for assisting provision of EC abroad constituted by execution of the program.

In order to achieve such an object, a first aspect of the present invention is a method for assisting provision of EC abroad, the method including the steps of: sending display information of at least one of articles included in first article information for a first EC site to a user terminal of a foreign user; receiving a notice that one or more displayed articles was selected from the user terminal; sending a purchase cost of the selected one or more articles to the user terminal; and receiving a notice to purchase the selected one or more articles.

According to a second aspect of the present invention, in the first aspect, the first article information is obtained from a first server providing the first EC site.

According to a third aspect of the present invention, in the second aspect, the first article information is obtained from the first server using an API.

According to a fourth aspect of the present invention, in the second or third aspect, the display information has a transition button for transitioning to an EC site provided on the first server.

According to a fifth aspect of the present invention, in any one of the first to fourth aspects, the method includes a step of sorting out an article that can be purchased out of a plurality of articles included in the first article information.

According to a sixth aspect of the present invention, in the fifth aspect, the sorting out includes not displaying an article that cannot be imported by the foreign user on the user terminal.

According to a seventh aspect of the present invention, in the fifth aspect, the sorting out includes not allowing to select an article that cannot be imported by the foreign user on the user terminal.

According to an eighth aspect of the present invention, in the fifth aspect, the sorting out includes notifying the user terminal that there is import restriction on the selected article after receiving the notice that the foreign user has selected an article with import restriction.

According to a ninth aspect of the present invention, in the fifth aspect, the sorting out includes notifying the user terminal that there is import restriction on the selected article after receiving the notice to purchase.

According to a tenth aspect of the present invention, in any one of the fifth to ninth aspects, the sorting out is performed according to a country in which a destination address of the foreign user exists.

According to an eleventh aspect of the present invention, in the tenth aspect, the sorting out is performed by referring to an import restriction table in which country names and importation restricted articles are associated.

According to a twelfth aspect of the present invention, in the tenth or eleventh aspect of the present invention, the method includes a step of the destination address or the country of the foreign user being input by the foreign user before the sorting out.

According to a thirteenth aspect of the present invention, in the twelfth aspect, the destination address or the country of the foreign user is inputted at the time of user registration.

According to a fourteenth aspect of the present invention is the tenth or eleventh aspect of the present invention, the method includes a step of inferring the country of the destination address before the sorting out.

According to a fifteenth aspect of the present invention, in the fourteenth aspect, the inference is performed based on an IP address assigned to the user terminal.

According to a sixteenth aspect of the present invention, in any one of the first to fifteenth aspects, the method includes a step of sending display information of at least one article included in the second article information for the second EC site to the user terminal of the foreign user.

According to a seventeenth aspect of the present invention, in the sixteenth aspect, the second article information is obtained from a second server providing the second EC site, the second server being different from the first server.

According to an eighteenth aspect of the present invention, in the sixteenth or seventeenth aspect, a unit price of one or more articles included in the first article information and a unit price of one or more articles included in the second article information are different from each other.

According to a nineteenth aspect of the present invention, in any one of the sixteenth to eighteenth aspects, the display information is configured to display only the inexpensive article or display the inexpensive article preferentially when the article included in the first article information and the article included in the second article information overlap with each other.

According to a twentieth aspect of the present invention, in any one of the sixteenth to nineteenth aspects, categories are respectively given to a plurality of articles included in the first article information and a plurality of articles included in the second article information, and the display information can be displayed on the user terminal for each category.

According to a twenty-first aspect of the present invention, in the twentieth aspect, a subdomain or a subdirectory for each category is assigned to the display information.

According to a twenty-second aspect of the present invention, in the twentieth or twenty-first aspect, the categories include EC sites.

According to a twenty-third aspect of the present invention, in any one of the twentieth to twenty-second aspects, the categories include prices.

According to a twenty-fourth aspect of the present invention, in any one of the twentieth to twenty-third aspects, the categories include regions.

According to a twenty-fifth aspect of the present invention, in any one of the twentieth to twenty-fourth aspects, the categories include a category used according to an attribute of the foreign user.

According to a twenty-sixth aspect of the present invention, in any one of the twentieth to twenty-fifth aspects, the categories include countries or regions in which destination addresses exist.

According to a twenty-seventh aspect of the present invention, in any one of the twentieth to twenty-sixth aspects, the categories include languages used.

According to a twenty-eighth aspect of the present invention, in any one of the twentieth to twenty-seventh aspects, the categories include combinations of a plurality of categories.

According to a twenty-ninth aspect of the present invention, in the twenty-eighth aspect, the combination is determined based on a purchase history.

According to a thirtieth aspect of the present invention, in the twenty-ninth aspect, the purchase history includes a purchase history of one or more users other than the foreign user having a destination address in the country of the foreign user.

According to a thirty-first aspect of the present invention, in the twenty-eighth aspect, the combination includes a combination of a region, an article category, and a price.

According to a thirty-second aspect of the present invention, in anyone of the twentieth to thirty-first aspects, the method includes a step of machine-translating the display information of the page other than the top page of the display of each category into a language used by the foreign user.

According to a thirty-third aspect of the present invention, in the thirty-second aspect, only a part of the top page is machine-translated.

According to a thirty-fourth aspect of the present invention, in the thirty-second aspect, neither of the top pages is machine-translated.

According to a thirty-fifth aspect of the present invention, in any one of the first to thirty-fourth aspects, the display information can be displayed in a language used by the foreign user.

According to a thirty-sixth aspect of the present invention, in the thirty-fifth aspect, the method includes a step of the language being input by the foreign user before sending the display information.

According to a thirty-seventh aspect of the present invention, in the thirty-fifth aspect, the method includes a step of inferring the language before sending the display information.

According to a thirty-eighth aspect of the present invention, in the thirty-seventh aspect, the inference uses a language setting of a web browser of the user terminal.

According to a thirty-ninth aspect of the present invention, in any one of the thirty-fifth to thirty-eighth aspects, the display information adjusts, according to the language, at least one of an article to be recommended, the amount of animation, and a background color.

According to a fortieth aspect of the present invention, in any one of the first to thirty-ninth aspects, the method further includes a step of sending an available delivery method for the selected one or more articles to the user terminal to have the available delivery method displayed.

According to a fortieth aspect of the present invention, in the forty-first aspect, the available delivery method is sent in response to receiving the notice to purchase.

According to a forty-second aspect of the present invention, in any one of the first to forty-first aspects, the purchase cost includes a price of the selected one or more articles.

According to a forty-third aspect of the present invention, in the forty-second aspect, the purchase cost includes a delivery cost of the selected one or more articles.

According to a forty-fourth aspect of the present invention, in the forty-third aspect, the delivery cost varies according to a country in which a destination address exists.

According to a forty-fifth aspect of the present invention, in the forty-third or forty-fourth aspect, the delivery cost is calculated based on at least one of a weight, a size, a delivery company, and a delivery method.

According to a forty-sixth aspect of the present invention, in any one of the forty-third to forty-fifth aspects, the delivery cost is sent to the user terminal together with the price of the selected one or more articles.

According to a forty-seventh aspect of the present invention, in the forty-sixth aspect, the article information includes at least one of weight and size for each article, and the delivery cost is estimated based on at least one of the total weight or the total size of the selected one or more articles.

According to a forty-eighth aspect of the present invention, in any one of the forty-third to forty-fifth aspects, the delivery cost is sent to the user terminal separately from the price.

Further, according a forty-ninth aspect of the present invention, in any one of the forty-third to forty-eighth aspects, the purchase cost is described in a currency of the country in which the destination address exists.

According to a fiftieth aspect of the present invention, in any one of the first to forty-ninth aspects, the user terminal is a mobile terminal.

According to a fifty-first aspect of the present invention, in any one of the first to forty-ninth aspects, the user terminal is a PC.

Furthermore, a fifty-second aspect of the present invention is a program for causing a computer to execute a method for assisting provision of EC abroad, the assisting method including the steps of: sending display information of at least one of articles included in first article information for a first EC site to a user terminal of a foreign user; receiving a notice that one or more displayed articles was selected from the user terminal; sending a purchase cost of the selected one or more articles to the user terminal; and receiving a notice to purchase the selected one or more articles.

Furthermore, a fifty-third aspect of the present invention is a server for assisting provision of EC abroad, the assisting server including: a sending unit for sending display information of at least one of articles included in first article information for a first EC site to a user terminal of a foreign user; and a receiving unit for receiving a notice that one or more displayed articles was selected from the user terminal, wherein the sending unit sends a purchase cost of the selected one or more articles to the user terminal to have the purchase cost displayed, and the receiving unit receives a notice to purchase the selected one or more articles.

A fifty-fourth aspect of the present invention is a method for assisting provision of EC abroad, the method including a step of forwarding a web browser of a user terminal of a foreign user from a first EC site to a website provided on an assisting server of the fifty-third aspect handling first article information of the first EC site.

According to a fifty-fifth aspect of the present invention, in the fifty-fourth aspect, the forwarding is performed after displaying that delivery abroad is available to the foreign user by a pop-up screen.

According to a fifty-sixth aspect of the present invention, in the fifty-fourth aspect, the forwarding is performed after the foreign user inputs or selects a country of the foreign user on the pop-up screen.

In a fifty-seventh aspect of the present invention, in the fifty-fourth aspect, the forwarding may be performed in response to a click or tap of a portion of a banner placed on an upper or lower area of a webpage of the first EC site by the foreign user.

According to a fifty-eighth aspect of the present invention, in the fifty-fourth aspect, the forwarding is performed in response to a click or tap of a portion of a message in a chat window provided on a webpage of the first EC site.

According to a fifty-ninth aspect of the present invention, in the fifty-eighth aspect, a reply result by the foreign user to a question displayed in the chat window is used when purchase is made on the website to which the forwarding is performed.

According to a sixtieth aspect of the present invention, in any one of the fifty-fourth to fifty-ninth aspects, a webpage of the first EC site is a webpage associated with a certain article, wherein a webpage to which the forwarding is performed is a page for notifying the assisting server of the intention to purchase the certain article.

Furthermore, according to a sixty-first aspect of the present invention, in any one of the fifty-fourth to sixtieth aspects, the method further includes a step of determining a country in which a destination address of a foreign user exists, wherein the forwarding is performed when the country is included in countries to which delivery is not available at the first EC site as result of the determination.

Furthermore, according to a sixty-second aspect of the present invention, in the sixty-first aspect, the forwarding is not performed when the country is included in countries to which sales is not available at the first EC site.

Furthermore, according to a sixty-third aspect of the present invention, in any one of the fifty-fourth to sixtieth aspects, the method further includes a step of determining a country in which a destination address of a foreign user exists, wherein the forwarding is not performed when the country is included in countries to which delivery is available at the first EC site as result of the determination.

According to a sixty-fourth aspect of the present invention, in the sixty-first to sixty-third aspects, the determination is performed based on an IP address assigned to the user terminal.

According to a sixty-fifth aspect of the present invention, in any one of the sixty-first to sixty-fourth aspects, one or more articles displayed on the user terminal are recommended based on an access history to the website by one or more other users from the same country with the country of the foreign user.

According to a sixty-sixth aspect of the present invention, in any one of the sixty-first to sixty-fourth aspects, one or more articles displayed on the user terminal are recommended based on an access history to the first EC site by one or more other users from the same country with the country of the foreign user.

According to a sixty-seventh aspect of the present invention, in any one of the sixty-first to sixty-fourth aspects, one or more articles displayed on the user terminal are recommended based on an access history to the first EC site by one or more users from a target country of the first EC site.

A sixty-eighth aspect of the present invention is a method for assisting provision of EC abroad, the method including the steps of: receiving a first URL inputted in a generation page for generating an order page displayed on a user terminal; obtaining an article name and a price of an article associated with an article page as article information from the article page indicated by the first URL; generating the order page for ordering proxy purchase of the article to an assisting server for assisting provision of EC abroad based on the obtained article information; and determining a second URL which is the URL of the order page.

According to a sixty-ninth aspect of the present invention, in the sixty-eighth aspect, the second URL is displayed on the generation page.

Furthermore, according to the seventieth aspect of the present invention, in the sixty-eighth or sixty-ninth aspect, the article information further includes at least one of an inventory of the article, an article description, and a weight or a size of the article.

According to a seventy-first aspect of the present invention, in any one of the sixty-eighth to seventieth aspects, the generation page includes a country field for inputting or selecting a destination address or a country of the destination address where a person making the order exists.

Furthermore, according to a seventy-second aspect of the present invention, in the seventy-first aspect, when delivery of the article is not available to the destination address or the country of the destination address, generation of the order page is not performed.

A seventy-third aspect of the present invention is a program for causing a computer to execute a method for assisting provision of EC abroad, the assisting method including the steps of: receiving a first URL inputted in a generation page for generating an order page displayed on a user terminal; obtaining an article name and a price of an article associated with an article page as article information from the article page indicated by the first URL; generating the order page for ordering proxy purchase of the article to an assisting server for assisting provision of EC abroad based on the obtained article information; and determining a second URL which is the URL of the order page.

A seventy-fourth aspect of the present invention is a device for assisting provision of EC abroad, the assisting device including: a receiving unit for receiving a first URL inputted in a generation page for generating an order page displayed on a user terminal; and a processing unit for determining a second URL which is a URL of the order page, wherein the processing unit obtains an article name and a price of an article associated with an article page as article information from the article page indicated by the first URL, and generates the order page for receiving an order of proxy purchase of the article based on the obtained article information.

A seventy-fifth aspect of the present invention is a method for assisting provision of EC abroad, the method including the steps of: receiving a first URL of a web page displayed on a user terminal; obtaining an article name and a price of an article associated with an article page as article information from the article page indicated by the first URL; generating the order page for ordering proxy purchase of the article to an assisting server for assisting provision of EC abroad based on the obtained article information; determining a second URL which is the URL of the order page; and forwarding the user terminal to the order page.

According to one aspect of the present invention, the foreign user does not purchase directly from the EC site but rather the foreign user is asked to select an article on a website provided by an assisting server for assisting provision of EC abroad, and an operator of the assisting server obtains the article by proxy. By adopting such a configuration, it is possible to alleviate various problems occurring in delivery abroad.

BRIEF DESCRIPTION OF THE DRAWINGS

FIG. 4 is a view illustrating an example of categorized display of a website provided by the assisting server according to an embodiment of the embodiment of the present invention.

DETAILED DESCRIPTION OF THE DRAWINGS

Hereinafter, embodiments of the present invention will be described in detail with reference to the drawings. Each embodiment can be appropriately combined with each other.

Figure 1:
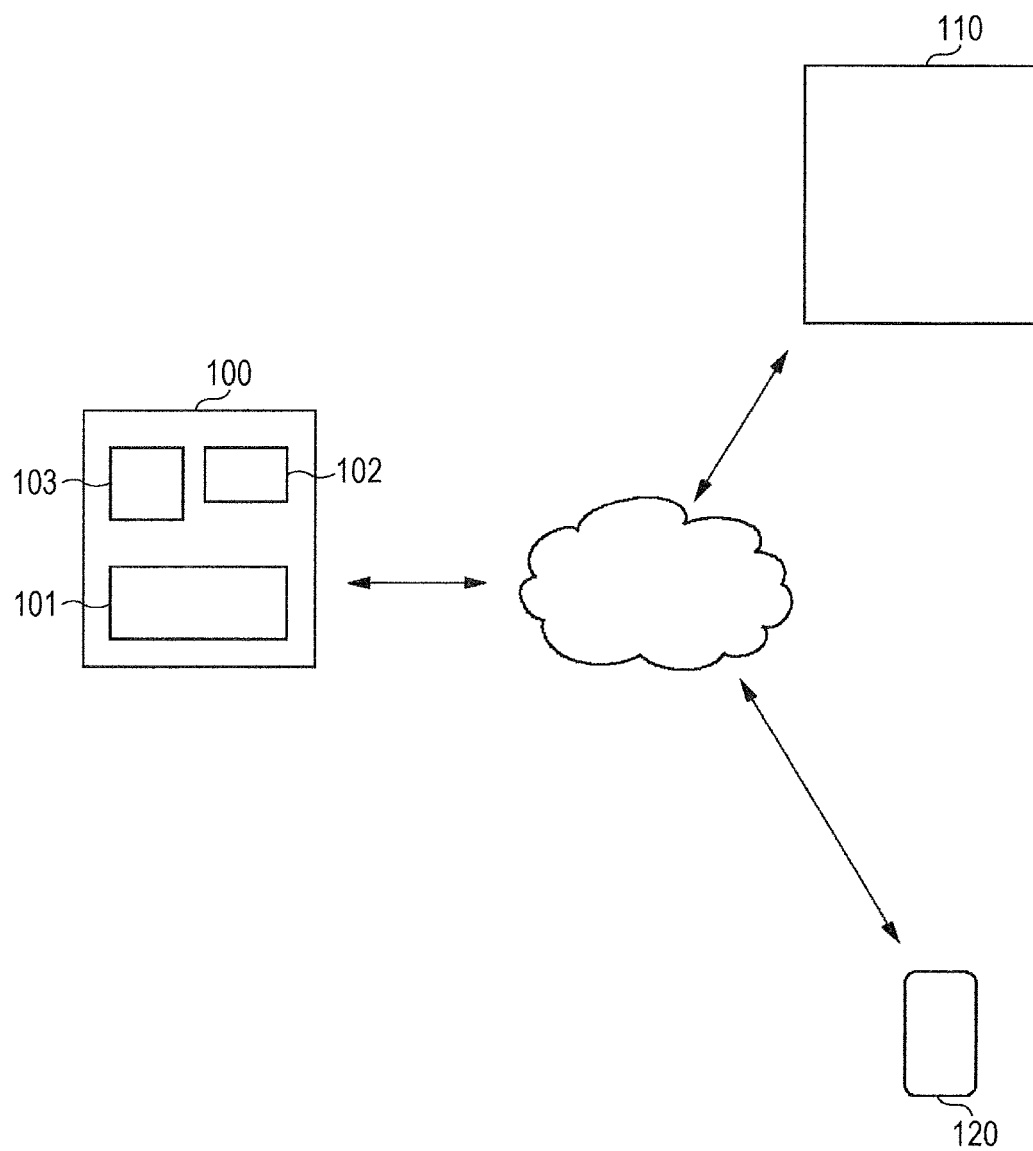
FIG. 1 is a diagram illustrating a basic configuration of an assisting server for assisting provision of EC abroad according to an embodiment of the present invention.

FIG. 1 illustrates a basic configuration of an assisting server for assisting provision of EC abroad according to the present invention.

An assisting server 100 includes a processing unit 101 such as a CPU, a communication unit 102 for communicating with another computer on a computer network, and a storage unit 103 for storing information used for processing in the processing unit 101.

In the storage unit 103, article information (corresponding to "first article information") for an existing EC site (corresponding to a "first EC site") is stored. The article information includes article name, price, and the like for each article. The information provided from the EC site can be stored in the storage unit 103, and furthermore the article information can be obtained from the server 110 (corresponding to a "first server") providing the EC site via the communication unit 102 using the API provided by the EC site and stored in the storage unit 103. Furthermore, the EC site can be scraped and stored in the storage unit 103.

Instead of the storage unit 103, some or all of the article information may be stored in an article information database (not illustrated) that can communicate with the assisting server 100.

The processing unit 101 generates display information for displaying at least one article included in the obtained article information on a display screen and sends the display information to a user terminal 120 of a foreign user via the communication unit 102.

The display information may be an HTML file that can be displayed by a web browser. Furthermore, in a case where the user terminal 120 is not a PC but a smartphone, a tablet, or the like, the display information can be made displayable by a mobile application installed in the user terminal 120. Furthermore, the display information may be displayable on a display screen of a wireless terminal (not illustrated) such as an IoT device connected to an IP network such as the Internet, and for example, it is possible to display a predetermined article or to display a button or the like for purchasing the article. As the display information, transition buttons for transitioning to the existing EC site may be provided in association with each article as appropriate.

The display information includes information for allowing the assisting server 100 to receive an article photo from a foreign user and to display one or more identical or similar articles determined by image analysis of the received photo on the display screen. With this configuration, purchase of article or the like interested by a foreign user browsing by a magazine, a website, or the like is significantly facilitated.

The foreign user selects an article which the foreign user wishes to purchase from at least one article displayed on the user terminal 120, confirms the purchase cost, and sends a notice to purchase to the assisting server 100.

On behalf of the foreign user, an operator of the assisting server 100 obtains the one or more articles from the above EC site using its own destination address, for one or more articles that the notice to purchase has been received. The operator inspects the one or more articles delivered, packs it, and sends it to the foreign user.

Conventionally, in order to make it possible for a foreign user to purchase at an EC site in which delivery abroad is not available, there is a service that assigns a destination address for purchase to a foreign user and delivers the delivered article to the foreign user. In a cross-border EC assisting service provided by using the present invention, the foreign user does not purchase directly from the EC site but rather the foreign user is asked to select an article on website provided by the assisting server 100 for assisting provision of EC abroad, and an operator of the assisting server 100 obtains the article by proxy.

By adopting such a configuration, according to the present invention, it is possible to alleviate various problems occurring in delivery abroad.

A method for assisting provision of EC abroad according to the present invention includes the steps of: sending, by the assisting server 100, display information of at least one of articles included in article information for an existing EC site to a user terminal 120 of a foreign user (S201); receiving, by the assisting server 100, a notice that a displayed article was selected from the user terminal 120 (S202); and further includes the steps of: sending, by the assisting server 100, a purchase cost of the selected article to the user terminal 120 (S203); and receiving, by the assisting server 100, a notice to purchase the selected article from the user terminal 120 (S204).

By executing a program for causing a computer to execute the assisting method on the assisting server 100, the assisting server 100 will possess a function corresponding to each processing. For example, the communication unit 102 functions as a sending unit and a receiving unit.

As a matter of course, in the present specification, the "server" may be constituted by a single server or may be constituted by a plurality of servers communicable with each other on a computer network, and it is noted that the "program" executed on the server may also include one or more programs to be executed on one or more servers.

(Import Restriction)

In the conventional service of assigning a destination address for purchase to a foreign user, from the viewpoint of the EC site, a foreign user seems to be like a domestic EC site user; therefore, there is a case where an article that should not be sold is sold. For example, there are forbidden articles such as reptile leather products forbidden to import and export under the Washington Convention on the protection of wild fauna and flora, and articles such as pharmaceuticals to which quantitative import restrictions are imposed. Concerning such articles, the operator of the conventional service finds a problem when inspecting the delivered article and notifies that the article cannot be shipped to a foreign user.

The assisting method according to the present embodiment further includes a step of sorting out an article that can be purchased, among articles included in the article information. The sorting out can prevent an article that cannot be imported by the foreign user from being displaying on the user terminal 120. For example, it is possible to determine an article that cannot be imported or an article with import restriction before sending the article information and exclude the articles from the article information to be sent to the user terminal 120, and it is possible not to display the articles on the user terminal 120 although the articles are included in the article information to be sent to the user terminal 120. In addition, it is also possible to disallow a foreign user from selecting an article that cannot be imported, on the user terminal 120. Furthermore, after receiving a notice that a foreign user has selected an article with import restriction, it is also possible to notify the user terminal 120 that import restriction exists on the selected article. Furthermore, after receiving the notice to purchase from the user terminal 120, it is also possible to notify the user terminal 120 that import restriction exists on the selected article.

The sorting out can be performed according to a country in which a destination address of a foreign user exists. For example, the sorting out can be performed by referring to an import restriction table in which country names and import restriction articles are associated. The import restriction article includes a forbidden article that cannot be imported by a foreign user, an article with quantitative restriction on the importation of foreign user, and the like. The import restriction table can be generated using machine learning based on user purchase history.

The destination address can be obtained by having the user input a name, an address including a country name, a language, an e-mail address, and the like as user registration before sorting out. At least the name and address can be mandatory. Furthermore, in response to receiving the notice that the displayed article is selected, input of the destination address can be requested. Furthermore, in response to receiving a notice to purchase, input of the destination address can be requested. In addition, only a country in which a destination address exists may be input, not the destination address.

The country in which a destination address exists may be inferred before the sorting. The inference or decision can be made based on the IP address assigned to the user terminal 120. When the user terminal 120 is a mobile terminal, it is also possible to infer or decide a country based on the position information by the GPS or the position information of a base station of a wireless communication.

As described above, by sorting out the importation restricted article, a burden that the operator of the assisting server 100 has to find an importation restricted article at the time of inspection and arrange with the foreign user how to handle the situation can be reduced.

(A Plurality of EC Sites)

One of the problems in delivery abroad is a delivery fare. Particularly in an EC site with low unit price, the delivery cost accounts for a large proportion, and there are quite a few cases that do not lead to purchase. In the case of delivery abroad, the delivery fare becomes high, so that many EC sites have this problem.

In the assisting method according to the present embodiment, it is possible to have articles delivered together with articles of an EC site with a higher average unit price by collectively purchasing the articles provided by multiple EC sites, so that the delivery cost can be relatively reduced.

More specifically, in the storage unit 103 or the article information database of the assisting server 100, like the first EC site, article information (corresponding to a "second EC article information") for a second EC site (corresponding to a "second EC site") can also be stored. This article information can be obtained from a server (not illustrated) (corresponding to a "second server") on which the second EC site is provided, the server being different from a server providing the first EC site.

The processing unit 101 generates display information for displaying at least one article included in the obtained article information on a display screen and sends the display information to a user terminal 120 of a foreign user via the communication unit 102. The display information can simultaneously display one or more articles included in the first article information and one or more articles included in the second article information.

Figures 2, 3:
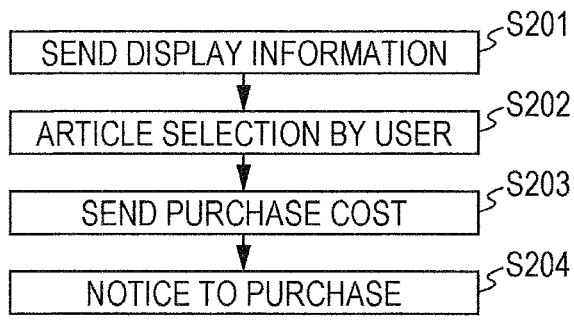
FIG. 2 is a flowchart illustrating a method for assisting the provision of EC abroad according to an embodiment of the present invention.
FIG. 3 is a view illustrating a display example (article name, purchase price, delivery cost, "checkout" button, and the like) for confirming contents of a shopping cart of a website provided by the assisting server according to an embodiment of the present invention.

The foreign user selects at least one article displayed on the user terminal 120 that the foreign user wishes to purchase, puts the selected article in a shopping cart, and can continue to select an article that the foreign user wishes to purchase, including an article provided at the first EC site (see FIG. 3). When the selection is completed, the user can send a notice to purchase to the assisting server 100 in response to a click or tap of the "checkout" button or the like.

Further, when articles included in a plurality of pieces of article information overlap with each other, the display information can be configured so that only the inexpensive article is displayed or the inexpensive article is preferentially displayed. With this configuration, it is possible to suppress a situation where a large number of identical articles from a plurality of EC sites are displayed and the screen becomes complicated.

(Display by Category)

In the assisting method according to the present embodiment, a category is respectively assigned to a plurality of articles included in a plurality of EC sites, and the articles can be displayed on the user terminal 120 for each category. With this configuration, it is possible to make it easier for a foreign user to find a plurality of articles that the foreign user wishes to purchase. In particular, it is possible to easily purchase articles provided at a plurality of EC sites beyond an EC site boundary.

For display information sent to the user terminal 120, a sub domain or a sub directory can be assigned for each category. Specifically, assuming that there is a category "category 1", if the comprehensive top of a website provided on the assisting server 100 is "http://www.xxxx.com/", a subdomain or subdirectory of "http://category 1.xxxx.com/" or "http://www.xxxx.com/category 1/" can be used.

The category includes an EC site, a price, a region, an article category, and the like. An article can be displayed for each EC site from which article information has been obtained, displayed with the lower limit, the upper limit or the range set on the price, displayed for each region like Hokkaido special articles, and displayed for each article category such as food, drink etc. like snack. FIG. 4 illustrates an example of display by the category of "Japan made (Made in Japan)".

The category includes a category used according to an attribute of a user such as gender, age, or the like. For example, in the case of women, it is possible to perform display by using fashion as a category. The attribute of the user can be determined based on the information inputted as user registration. In addition, it is possible to perform display by using a country or a region (city, or the like) in which a destination address exists, a language used, nationality, and the like, as a category.

Furthermore, the category may be a combination of a plurality of categories. For example, a combination of region, article category and price such as "Hokkaido's snacks 5000 yen" can be considered. Furthermore, a combination of a country and a language used such as "a Chinese user of the United States" can be considered.

The combination can be determined based on the purchase history, and in particular, can be determined based on the purchase history of users who has a destination address in a country in which a destination address of the foreign user who selects an article from now exists.

(Multilingual Support)

In order for foreign users to properly select and obtain an article provided at an EC site of another country, it is desirable to match the display of the website provided on the assisting server 100 with the language used by the foreign user. Therefore, in the assisting method according to the present embodiment, the display information can be displayed in the language used by the foreign user.

The input of the language used may be requested before sending the display information to the user terminal 120.

Furthermore, the language used may be inferred, for example, by using the language setting of the web browser of the user terminal 120.

Furthermore, based on the language used, the display information can be adjusted with respect to at least one of an article to be recommended, the amount of animation, and a background color. For example, depending on whether the language used is Chinese or English, an article to be recommended judged from the purchase history will differ. Furthermore, in the case of Chinese speakers, there is a tendency to prefer the dynamic content that the amount of animation on the webpage is large and change is fast, compared with the English speaker; therefore, it is also preferable to perform adjustment according to such preference. The same applies to the background color. Among Chinese, there is a situation where it is useful to distinguish between traditional Chinese characters and simplified characters.

When displaying an article for each category, machine translation can be used to translate the display information of a page other than the top page of the display of each category into the language used by a foreign user. It is preferable that only a part of the top page is machine-translated, or translation of the top page is performed by a translator without using machine translation. This allows a foreign user to easily grasp the contents of the top page accurately and to grasp the contents of the subsequent pages by making use of machine translation while suppressing the translation cost.

(Delivery Method)

Various articles are provided at the EC site, and the types of articles selectable by foreign users on the website provided on the assisting server 100 are diverse. Among the articles, there are dangerous goods that cannot be brought into aircraft such as high pressure gas and flammable liquid, and depending on a delivery method, a foreign user may not be able to import to own country. For example, an oil stove cannot be imported by air, but it can be imported by sea. Depending on the delivery method, there are also some amount restrictions.

Therefore, the assisting method according to the present embodiment further includes a step of sending the available delivery method for the selected article to the user terminal 120 to have the available delivery method displayed. A list of the available delivery method can be sent in response to receiving a notice to purchase from the user terminal 120.

As described above, by informing the user of the available delivery method in advance, a burden that the operator of the assisting server 100 has to find that a delivery method that cannot be used is designated at the time of inspection and arrange with the foreign user how to handle the situation can be reduced. It is possible to display at least one of the price of each delivery method and the number of days required, together with the available overseas delivery method.

(Purchase Costs)

The purchase cost sent to the user terminal 120 includes the price of the selected article. In addition, the purchase cost may include the delivery cost of the selected article, which can be varied according to a country in which a destination address exists. Furthermore, the delivery cost can be calculated based on at least one of weight, size, delivery company, and delivery method.

The delivery cost may be displayed on the user terminal 120 together with the price of the selected article or may be displayed separately from the price. When at least one of weight and size is included in the article information, it is possible to estimate the delivery cost based on at least one of the total weight and the total size of the selected one or more articles and display the delivery cost together with the price. The delivery cost can be calculated based on at least one of the total weight or the total size after the operator of the assisting server 100 obtained the selected one or more articles by proxy, and the delivery cost can be displayed separately from the price.

In addition, the purchase cost can be represented in a currency of a country in which a destination address of the foreign user exists.

(Forwarding)

Even if there are a certain number of accesses from abroad, an EC site that does not support delivery abroad cannot actually convert them into sales. Therefore, in the assisting method according to the present embodiment, the web browser of the user terminal 120 that has accessed the EC site is forwarded from the EC site to the website provided on the assisting server 100.

The forwarding is performed after displaying the fact that delivery abroad of an article provided on the EC site is available to the foreign user by a pop-up screen.

Figure 5:
FIG. 5 is a view illustrating an example of a pop-up screen for performing forwarding from an EC site that does not support delivery abroad according to an embodiment of the present invention.

As illustrated in FIG. 5, a pop-up screen 500 has a forwarding button 501 ("CONTINUE SHOPPING") for performing a forwarding, and can perform forwarding in response to a fact that a foreign user clicks or taps the forwarding button 501. In addition, the pop-up screen 500 can be arranged close to the right end of the web browser. Accordingly, it is possible to lower the hurdle or barrier for each EC site to adopt pop-up display for a foreign user. The forwarding may be caused in response to a click or tap of a portion on a pop-up screen as an alternative to the forwarding button. The pop-up screen 500 may include a moving image or a video as contents.

The forwarding can be performed after a foreign user inputs or selects a destination address or the country of the destination address on the pop-up screen 500.

Figure 6:
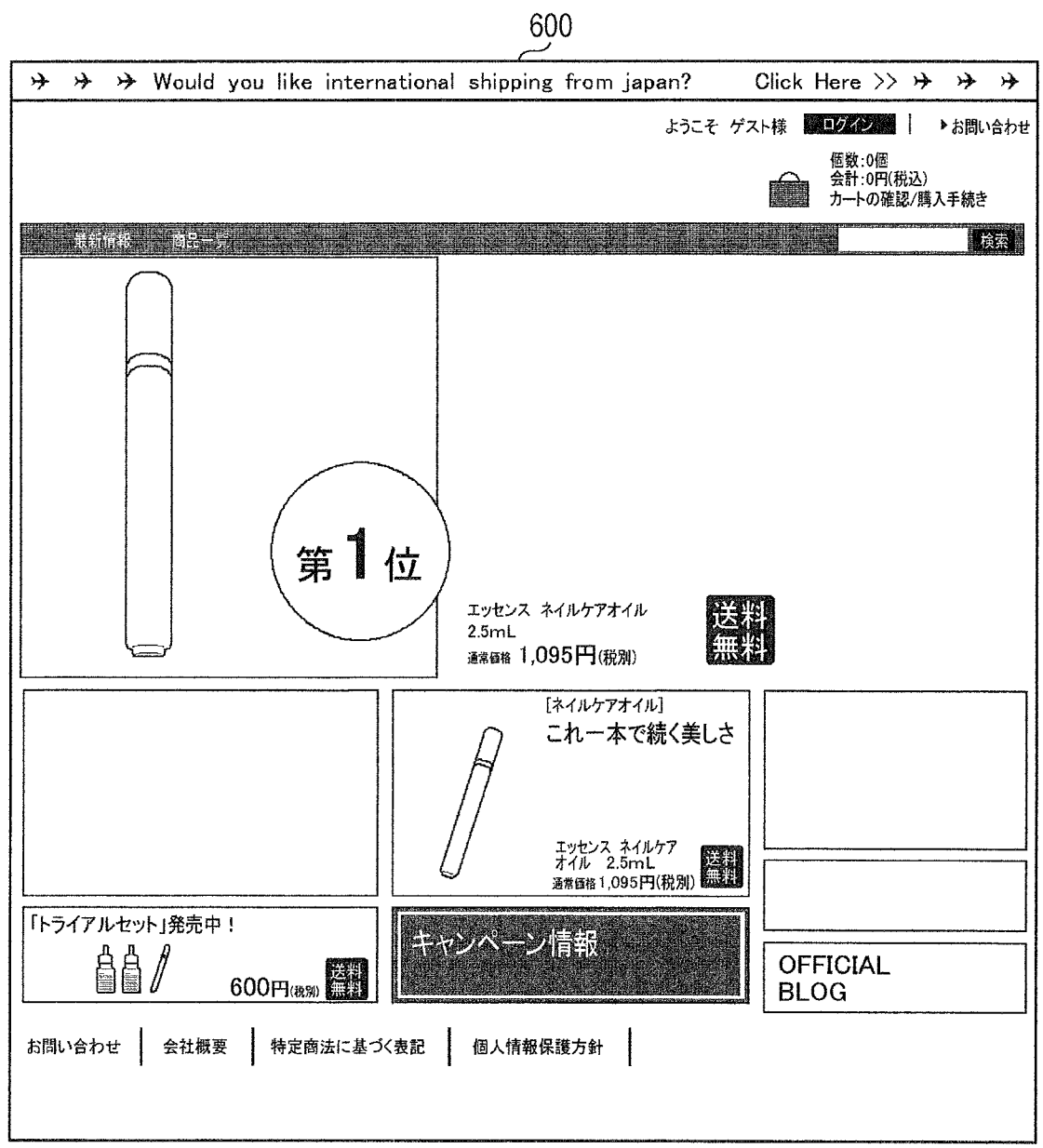
FIG. 6 is a view illustrating an example of a web banner for performing forwarding from an EC site that does not support delivery abroad according to an embodiment of the present invention.

As an alternative to the pop-up screen 500, banner or web banner 600 can be used for forwarding as illustrated in FIG. 6. The banner 600 can be placed at the upper or lower area of the webpage, and the forwarding can be caused in response to a click or tap of a portion of the banner 600.

The forwarding can also be performed in response to a click or tap of the forwarding button or web banner displayed instead of a selection button (such as "ADD TO CART" button) or a purchase button for each article. Furthermore, instead of replacing the selection or purchase button, the forwarding button or web banner can be placed near the selection button or the purchase button.

Figure 7:
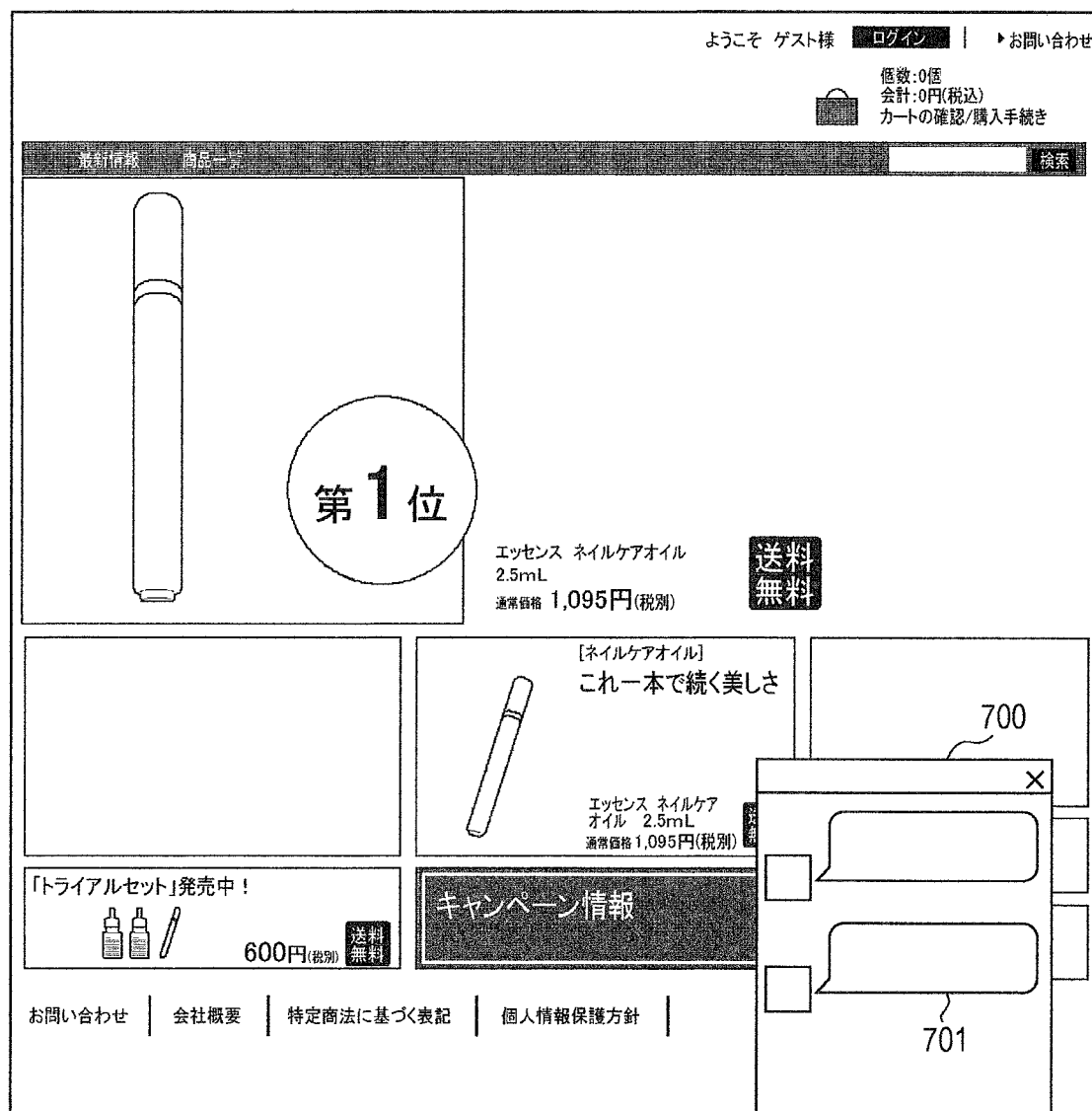
FIG. 7 is a view illustrating an example of a chat window for performing forwarding from an EC site that does not support delivery abroad according to an embodiment of the present invention.

As illustrated in FIG. 7, the forwarding can be caused by the following manner. That is, a chat window 700 is provided on the webpage, a link or the URL to a forwarding destination is displayed in a message 701 in the window 700, and a foreign user clicks or taps the link which is at least part of the message 701. As described below, it is possible to distinguish a country of the user by an IP address or the like and convey that delivery abroad is available with the language of the country of the user or English by the message 701. A forwarding destination of a link may be an arbitrary webpage provided on the assisting server 100 or a webpage associated with the original EC site. If the webpage accessed by a foreign user is an individual article page, it is possible to put the article in the shopping cart as an object to be purchased, and the forwarding destination of the link may be a webpage such as a purchase page, a settlement page or the like for notifying that the article is to be purchased. With this configuration, it is possible to reduce the probability that the user leaves after the forwarding. Furthermore, if the user replies to a question displayed in the chat window 700 automatically or by a chat operator to a foreign user, it possible to specify in advance the number of desired articles, size, and the like for the purchase on a forwarding destination website. It is possible to have a destination address or a country of the destination address specified in advance and use the reply result on the page or site of the forwarding destination. The reply result can be stored on the above-mentioned server or a database or storage device that is communicable from the server.

The forwarding further includes a step of determining a country in which a destination address of the user exists and can be performed as a result of the determination if the country is abroad or if the country is included in countries to which delivery is not available by the EC site. This is because it is sometimes desirable to not forward an access from a country to which delivery is supported by the EC site itself. At this time, it is possible to place the pop-up 500 or the banner 600 at an eye-catching position on the display screen of the user terminal 120. For example, it is preferable to place the pop-up 500 in the vicinity of the center and place the banner 600 in the upper area. Whether the delivery is supported or not may be decided for each article, and forwarding may be performed in a case when some articles cannot be delivered but delivery is available as a whole. In a case where the user accesses the individual article page, it is possible to determine delivery availability for the article and perform forwarding if delivery is available.

If the country of the foreign user is included in countries to which sales is not allowed at the EC site, it is also possible not to forward or to display the pop-up screen 500 or the banner 600, which is the premise of the forwarding. This is because sales through the assisting server 100 may not be appropriate for a country where a distributor and the like exist. The country can be determined based on the IP address assigned to the user terminal 120. That is, a country of the user terminal 120 may be inferred as a country in which a destination address exists.

If on a part or all of web pages of the EC site, a tag or code for determining a country where a destination address of the user who has accessed the page exists or a country to which the access source belongs is set and a session ID for identifying the user who accessed is given, in addition to which article web page has been viewed by the user who has accessed a website of the forwarding destination, which article the user has clicked or tapped to show interest, which article the user put in the shopping cart, or which article the user has actually purchased, it is possible to specify an article browsed many times, an article clicked or tapped many times, and an article purchased many times at the original EC site for each user.

Specifically, when a script is read into the web browser of the user terminal 120, a session ID for identifying the user terminal 120 is given and stored in the assisting server 100 or another server. For the session ID, a validated period or a validated date can be set. When the user terminal 120 accesses another website on which a script relating to session management is set, the presence or absence of a session ID is determined, and in a case where there is the session ID, in association with the session ID, an access source IP address, an accessed website, a browser type, a browser language (language used), an access time, User-Agent, and the like can be accumulated in the assisting server 100 or another server, as log information. Regardless of the presence or absence of a session, a predetermined tag, code or script can be set on each page, and each time access is made to those pages, an access source IP address, a website accessed, a browser type, a browser language (language used), an access time, UserAgent and the like may be accumulated. Furthermore, it is also possible to specify an access history for each country where a destination address of the user exists or each country of an access source. For example, the country can be specified using the access source IP address.

For example, in order to promote multilingual support, selection of which page on the website provided on the assisting server 100 is to be translated with high accuracy by a translator can be made based on the access history of a plurality of users. Furthermore, recommendation of article on a website provided on the assisting server 100 can be performed based on an action history or access history of the user or an access history of at least one of the website and the original EC site by one or more other users from the same country as the country of the user, or recommendation can be performed based on an access history of the original EC site by one or more users from a country in which the original EC site exists or from a target country of the original EC site (for example, users who accessed an EC site operated in Japan from Japan). In addition to the recommendation, various histories may be used similarly in the selection of a target page to be translated by a translator.

Furthermore, a browsing time of each website can be calculated from a time until the next page is viewed. It is possible to use the browsing time as log information by setting a predetermined threshold value and lowering the weight of the fact that a page was browsed when transition to another page occurs in a short time.

Furthermore, based on the browser language of a foreign user who has accessed, or based on the access source IP address and the browser language, display on the display screen, such as recommendation of articles, can be changed. For example, it is possible to change the display between the Chinese browser user and the English browser user, accessed from America.

(Order Page Generation (1))

For example, a foreigner A living or staying in Japan may be asked to purchase Japanese products from a friend B outside Japan. In many cases, a foreign user becomes interested in a Japanese product by reading article X that introduces the Japanese product in a foreign language such as English, and the foreign user sends the link of the article X to the friend A in Japan by e-mail, message, chat, and the like to make a request. In addition to buying and mailing at a real store, in some cases the friend A in Japan who has received the request can find a page Y at which the product can be purchased from the EC site of Japan and reply to the friend B so that friend B can purchase by himself. However, if delivery abroad is not available even if the product is sold, or delivery is not supported for the country of the friend B, after all, the friend A in Japan should purchase an article from the EC site and deliver the article abroad to the friend B.

Figure 8:
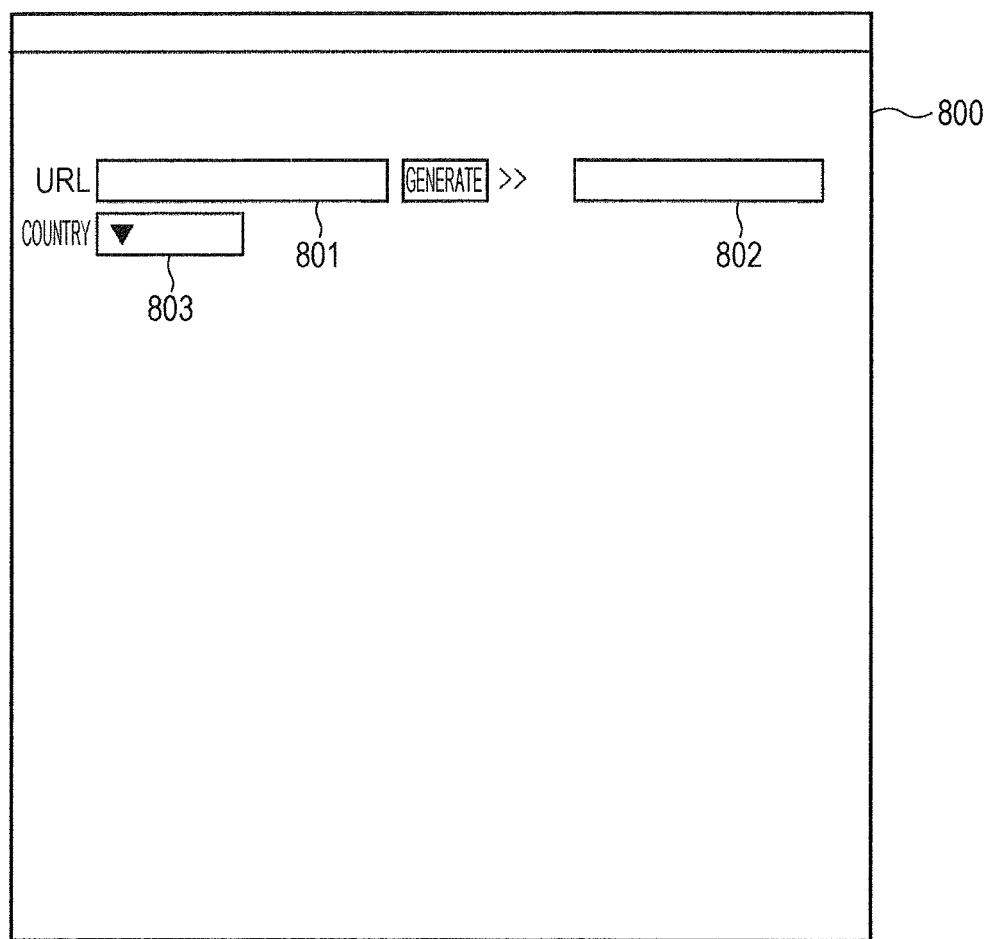
FIG. 8 is a view illustrating an example of a URL generation page of order page for the assisting server for assisting the provision of EC abroad according to an embodiment of the present invention.
Figure 9:
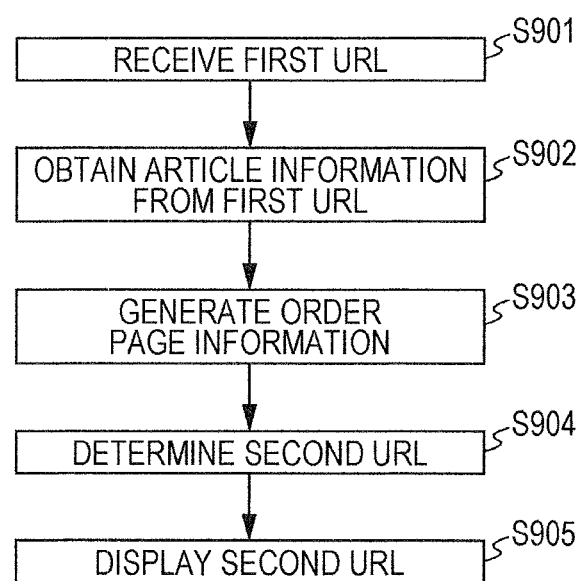
FIG. 9 is a flowchart illustrating a URL generation process of order page for the assisting server for assisting the provision of EC abroad according to an embodiment of the present invention.

In such a case, as illustrated in FIG. 8, when the URL of a predetermined article page Y on the EC site of Japan is inputted in a first URL field 801, a URL to an order page Z for the proxy purchase of the article is generated and displayed in a second URL field 802. The foreigner A in Japan can send this URL to the friend B so that friend B himself can ask for proxy purchase.

A server that provides a webpage 800 for generating an order page is a platform such as the assisting server 100 for supporting the provision of EC abroad, including settlement, delivery, and the like, in one aspect. After receiving a first URL inputted in the first URL field 801 displayed on the display screen of the user terminal of the foreigner A (S901), article information such as an article name and a price of an article associated with the webpage is obtained from the webpage indicated by the first URL (S902). It may also be possible to obtain at least one of an article description, an inventory, and a weight or a size of the article. The server generates information for displaying an order page for ordering proxy purchase of the article based on the obtained article information (S903). In the order page, it is possible to select the number of articles, the size, and the like, and it is possible to input a name of requester, an address including a country name, a language, a mail address, and the like. In a case where the requester has already been registered as the user of the assisting server 100, it is not necessary to input these pieces of user information. Part or all of the requester information can be inputted by the foreigner A together with or in addition to the first URL. Then, the server determines the second URL of the generated order page (S904) and can display the second URL in the second URL field 802 of the generation page 800 (S905). Although an example in which the second URL field 802 is provided on the same page as the webpage 800 having the first URL field 801 is described, the present invention is not limited to this. In addition to displaying on a separate page, it can also be sent to the user terminal by e-mail, message, chat or the like. Further, if the destination such as the requester's mail address or the like is known, the second URL may be sent directly to the requester. The server providing the generation page of an order page and the server for actually receiving the order of the proxy purchase may be the same or may be configured separately. The function corresponding to each described processing is realized by executing a program in each server or device in the same manner as described for the assisting server 100.

On the order page, it is possible to provide a button for notifying the server of the intention to purchase after a client B makes a necessary input; however, before proceeding with settlement processing, confirmation may be made once as to whether or not an article to be purchased can be delivered to a country of the client B, on the server. Alternatively, in a case where a destination address or a country 803 of the destination address is input or selected on the webpage 800 for generating an order page and the specified article cannot be delivered to the country for reasons such as import impossibility, a message that an order page cannot be generated may be displayed or sent without generating an order page. At this time, if the article description is obtained as a part of the article information, the article description can be used to improve the accuracy of delivery judgment such as import impossibility.

The order page is generated by a foreigner A living in Japan inputting an URL in the first URL column 801; however, it is possible to install a plug-in application that automatically obtains a URL of a webpage currently being displayed by a web browser in response to a click or tap of a button on a user terminal, and causes the user terminal to generate article information and generate an order page using the article information. By clicking or tapping a plug-in icon, requester information including a contact address such as a mail address of a friend B who is the requester may be inputted and the generated order page may be directly conveyed. At least one of generation of article information and generation of an order page may be performed not by the user terminal but by a server receiving the URL displayed by the user terminal.

In addition, instead of installing the plug-in application by the foreigner A or the like living in Japan, a friend B or the like residing abroad can install the plug-in application on his or her terminal and clicks or taps on a webpage showing an article of interest, whereby it is possible to generate article information and an order page on a server that provides the webpage, a server for actually receiving an order for proxy purchase, or another server, to forward a web browser of the terminal of friend B or the like to the order page.

Alternatively, when the friend B accesses an EC site of Japan directly without going through a third party such as a foreigner A living in Japan, as described above, a pop-up screen, a banner, a chat window, and the like are displayed, and when the friend B clicks or taps the pop-up screen, the banner, the chat window, and the like, it is also possible to generate an order page on a server that provides the EC site or on a separate server and display the order page on the user terminal of the friend B. In other words, the user terminal of the friend B can be forwarded to the order page. For the details of the forwarding, the various aspects described above can be applied. Accordingly, it is possible to easily perform sales for access from abroad even for an EC site by a small-scale EC company for which it is difficult to allocate resources providing article information such as an article name, a price, and the like beforehand to the assisting server 100 as illustrated in FIG. 1.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

REFERENCE SIGNS LIST

100 Assisting server
101 Processing unit
102 Communication unit
103 Storage unit
110 Server
120 User terminal
500 Pop-up screen
501 Forwarding button
600 Web banner
700 Chat window
701 Message
800 Generation page of order page
801 First URL field
802 Second URL field
803 Country selection field

The invention claimed is:

1. A method for assisting provision of EC abroad, comprising the steps of:
  determining a country of a foreign user who accessed an EC site, and
  causing a button or a banner to be displayed, for forwarding a web-browser of a user terminal of the foreign user from the EC site to a website provided by an assisting server different from a server providing the EC site, which handles article information of the EC site,
  wherein the forwarding is performed in response to a click or tap by the foreign user of a portion of the button or the banner, and
  wherein one or more articles displayed on the user terminal are recommended based on (a) an access history to the EC site or the website by one or more other users from the same country with the country of the foreign user or (b) an access history to the EC site by one or more users from a target country of the EC site.

2. The method according to claim 1, wherein the forwarding is performed after displaying the fact that delivery abroad is available to the foreign user by a pop-up.

3. The method according to claim 1, wherein the forwarding is performed after the foreign user has input or selected a country in which the foreign user resides on the pop-up.

4. The method according to claim 1, wherein the forwarding is performed in response to a click or tap by the foreign user of a portion of a banner placed on an upper or lower area of a webpage of the EC site.

5. The method according to claim 1, wherein the forwarding is performed when the country is included in the countries to which delivery is not available at the EC site as result of the determination.

6. The method according to claim 5, wherein the forwarding is not performed when the country is included in countries to which sales is not available at the EC site.

7. The method according to claim 1, wherein the forwarding is not performed when the country is included in countries to which delivery is available at the EC site as result of the determination.

8. The method according to claim 1, wherein the determination is performed based on an IP address allocated to the user terminal.

9. A computer readable storage storing a program for causing a server to perform a method for assisting provision of EC abroad, the method comprising the steps of:
  determining a country of a foreign user who accessed an EC site, and
  causing a button or a banner to be displayed, for forwarding a web-browser of a user terminal of the foreign user from the EC site to a website provided by an assisting server different from a server providing the EC site, which handles article information of the EC site,
  wherein the forwarding is performed in response to a click or tap by the foreign user of a portion of the button or the banner, and
  wherein one or more articles displayed on the user terminal are recommended based on (a) an access history to the EC site or the website by one or more other users from the same country with the country of the foreign user or (b) an access history to the EC site by one or more users from a target country of the EC site.

10. A server assisting provision of EC abroad which determines a country of a foreign user who accessed an EC site, and
  causes a button or a banner to be displayed, for forwarding a web-browser of a user terminal of the foreign user from the EC site to a website provided by an assisting server different from a server providing the EC site, which handles article information of the EC site,
  wherein the forwarding is performed in response to a click or tap by the foreign user of a portion of the button or the banner, and
  wherein one or more articles displayed on the user terminal are recommended based on (a) an access history to the EC site or the website by one or more other users from the same country with the country of the foreign user or (b) an access history to the EC site by one or more users from a target country of the EC site.

* * * * *